(12) United States Patent
Shet et al.

(10) Patent No.: US 7,895,398 B2
(45) Date of Patent: Feb. 22, 2011

(54) SYSTEM AND METHOD FOR DYNAMICALLY ADJUSTING THE CACHING CHARACTERISTICS FOR EACH LOGICAL UNIT OF A STORAGE ARRAY

(75) Inventors: Uday D. Shet, Honnavar (IN); Peyman Najafirad, Austin, TX (US); Ramesh S. Rajagopalan, Mysore (IN)

(73) Assignee: Dell Products L.P., Round Rock, TX (US)

( * ) Notice: Subject to any disclaimer, the term of this patent is extended or adjusted under 35 U.S.C. 154(b) by 602 days.

(21) Appl. No.: 11/403,060

(22) Filed: Apr. 12, 2006

(65) Prior Publication Data
US 2007/0028053 A1 Feb. 1, 2007

(30) Foreign Application Priority Data
Jul. 19, 2005 (IN) .................. 1875/DEL/2005

(51) Int. Cl.
*G06F 12/00* (2006.01)
(52) U.S. Cl. ............ 711/129; 711/133; 711/144; 711/145; 711/170
(58) Field of Classification Search ............ 711/129, 711/144, 145, 170, 133
See application file for complete search history.

(56) References Cited

U.S. PATENT DOCUMENTS

| | | | |
|---|---|---|---|
| 4,463,424 A * | 7/1984 | Mattson et al. ............ 711/136 |
| 4,947,319 A | 8/1990 | Bozman |
| 5,394,531 A | 2/1995 | Smith |
| 5,809,560 A | 9/1998 | Schneider |
| 5,815,648 A | 9/1998 | Giovanetti |
| 5,926,834 A | 7/1999 | Carlson et al. |
| 6,148,368 A * | 11/2000 | DeKoning ............ 711/113 |
| 6,163,773 A | 12/2000 | Kishi |
| 6,427,195 B1 * | 7/2002 | McGowen et al. ......... 711/153 |
| 7,058,764 B2 * | 6/2006 | Bearden ................ 711/129 |
| 7,117,309 B2 * | 10/2006 | Bearden ................ 711/137 |
| 7,447,843 B2 * | 11/2008 | Ishikawa et al. ......... 711/129 |
| 2003/0061448 A1 * | 3/2003 | Rawson, III ............ 711/133 |

(Continued)

OTHER PUBLICATIONS

Castets et al., IBM Enterprise Storage Server, IBM Redbooks, Sep. 2001, p. 27, 65-66, available at http://www.redbooks.ibm.com/redbooks/pdfs/sg245465.pdf.

(Continued)

*Primary Examiner*—Hong Kim
(74) *Attorney, Agent, or Firm*—Baker Botts L.L.P.

(57) ABSTRACT

A system and method is disclosed for the adaptive and dynamic adjustment of the characteristics of a cache on a basis that is specific the operation of each logical unit. A storage controller may include a cache. The cache is subdivided so that a portion of the cache is associated with each logical unit that is coupled to the storage controller. A cache management utility monitors the data access commands transmitted to each logical unit of the storage array. The size of the portion of the cache dedicated to each logical unit may be adjusted on the basis of the data access commands directed to the logical unit. The size of the read cache subportion and the size of the write cache subportion of a cache portion associated with a single logical unit may be adjusted on the basis of the read and write commands directed to the logical unit.

19 Claims, 3 Drawing Sheets

U.S. PATENT DOCUMENTS

| | | | |
|---|---|---|---|
| 2005/0071599 A1* | 3/2005 | Modha et al. | 711/170 |
| 2005/0076115 A1 | 4/2005 | Andrews et al. | |
| 2006/0143396 A1* | 6/2006 | Cabot | 711/134 |
| 2006/0236033 A1 | 10/2006 | Guinn et al. | |
| 2008/0244183 A1* | 10/2008 | Ishikawa et al. | 711/129 |

OTHER PUBLICATIONS

Castets et al., IBM TotalStorage Enterprise Storage Server Model 800 Performance Monitoring and Tuning Guide, IBM Redbooks, Jul. 2003, p. 17-23, available at http://www.redbooks.ibm.com/redbooks/pdfs/sg246422.pdf.

HP Co, HP StorageWorks Cache LUN, 2002, available at http://h20195.www2.hp.com/V2/GetPDF.aspx/5981-2658EN.pdf.

Hitachi Data Systems, Hitachi Lightning 9900 V Series Enterprise Storage Solutions, Dec. 2004, p. 7-9, available at http://epoka.dk/media/HDS_9970_og_9980_datasheetpdf.pdf.

\* cited by examiner

SYSTEM AND METHOD FOR DYNAMICALLY ADJUSTING THE CACHING CHARACTERISTICS FOR EACH LOGICAL UNIT OF A STORAGE ARRAY

TECHNICAL FIELD

The present disclosure relates generally to storage systems, and, more particularly to a system and method for dynamically adjusting the caching characteristics for each logical unit of a storage array.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may include or comprise a storage system. The storage system may include an array of storage drives that are managed at a storage controller according to a fault-tolerant storage methodology, such as one of the RAID storage formats. The drives of the storage array may include several logical units or LUNs. From the perspective of a host, each logical unit appears a physical disk or storage space and not as a collection of data strips spread across one or more of the drives of the array. The storage controller may also include a cache for caching writes to or reads from the drives of the drive array. Although the cache of the storage controller may be apportioned among the logical units of the storage array, the process of apportioning the cache among the logical units of the array is typically accomplished on a manual, trial-and-error basis that does not easily take into account the characteristics of the data access patterns for each logical unit.

SUMMARY

In accordance with the present disclosure, a system and method is disclosed for the adaptive and dynamic adjustment of the characteristics of a cache on a basis that is specific the operation of each logical unit. A storage controller may include a cache. The cache is subdivided so that a portion of the cache is associated with each logical unit that is coupled to the storage controller. A cache management utility monitors the data access commands transmitted to each logical unit of the storage array. The size of the portion of the cache dedicated to each logical unit may be adjusted on the basis of the data access commands directed to the logical unit. The size of the read cache subportion and the size of the write cache subportion of a cache portion associated with a single logical unit may be adjusted on the basis of the read and write commands directed to the logical unit.

The system and method disclosed herein is technically advantageous because the cache adjustment technique operates on a basis that is specific to each logical unit of the storage array. The size and the characteristics of the cache apportioned and dedicated to each logical unit of the cache is adjusted on the basis of the data access commands being transmitted to the associated logical unit. As a result, the cache that is associated with a logical unit may be adjusted in a manner reflects the status of the data access commands being transmitted to the logical unit.

Another technical advantage of the system and method disclosed herein is that the cache adjustment method disclosed herein is dynamic in its operation. The system and method is operable to monitor the data access commands transmitted to each logical unit of the storage array. In response to the transmission of the data access commands, the system dynamically adjusts the characteristics of one or more of the cache portions of the cache. As a result, the characteristics of the cache are adjusted on an automated basis relative to characteristics of the data access command transmitted to each logical unit of the storage array.

Another technical advantage of the cache management system and method disclosed herein is that the method is adaptive and is operable to modify the size of the cache associated with each logical unit to achieve a cache size that is optimal for the operation of the entire storage array. The system and method described herein continually adjusts the size of the cache to reflect the current operation of the storage network, including the transmission of read and write commands to the logical units of the storage array. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
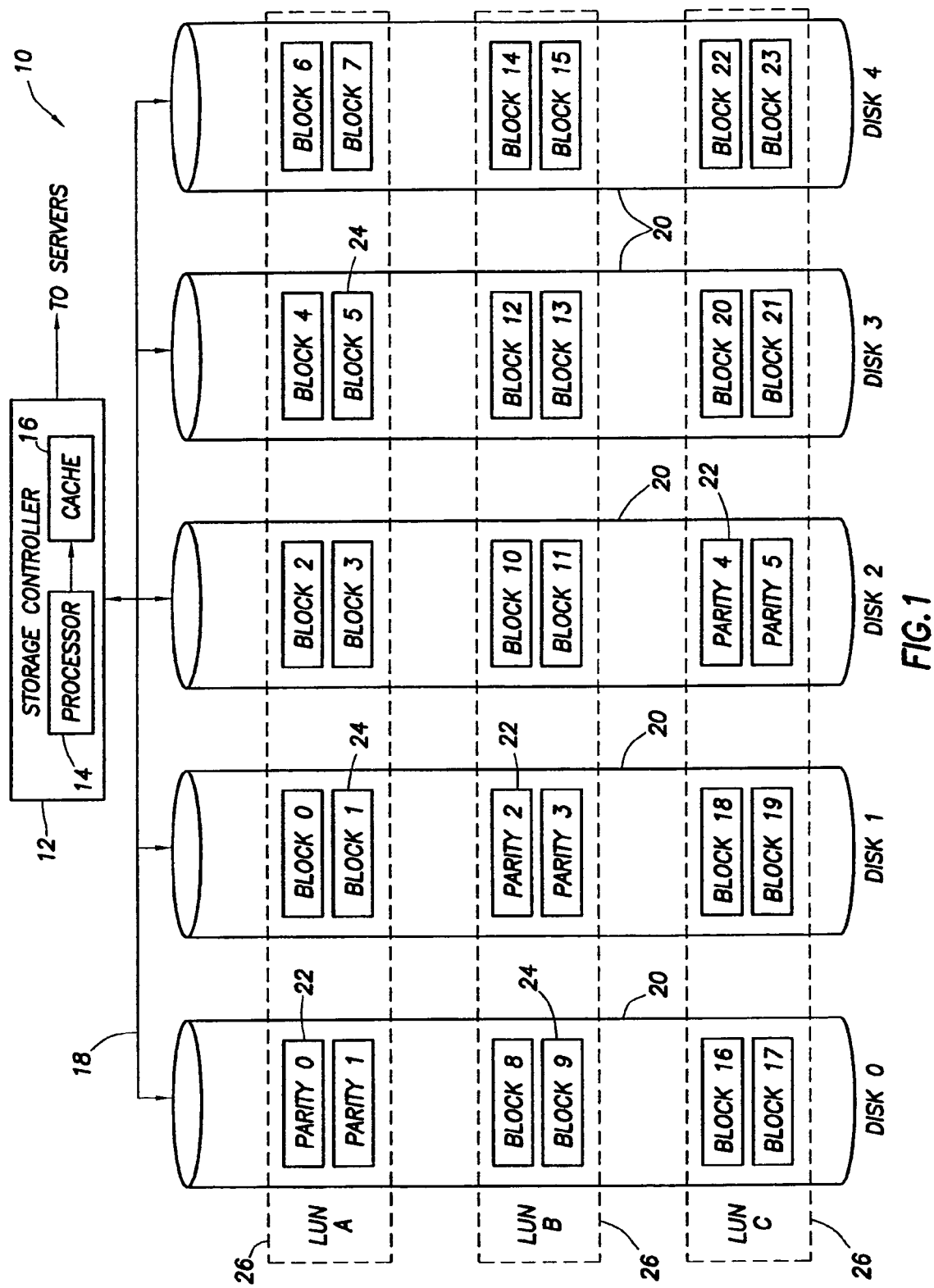
FIG. 1 is a diagram of a storage network.

Shown in FIG. 1 is a diagram of a storage network 20. Storage network 10 includes a RAID controller 12 and a RAID array of five disks 20. The RAID array of FIG. 1 is a Level 5 array, which is sometimes referred to as a rotating parity RAID array. In a RAID Level 5 storage array, data is striped across the disks of the array. For each stripe, the set of parity bits generated by an exclusive-OR of the strips of each stripe are stored on a disk that is separate from the data blocks of the stripe. The parity bits for the respective stripes of data are distributed among the disks of the storage system so that each disk will likely contain both data blocks for the data in the stripe and parity bits related to some other set of data in another stripe. In a RAID Level 5 RAID array, it is typical that no single disk includes all of the parity data. In the case of a Level 5 RAID array, if one of the disks fails, the data on the disk can be rebuilt by performing an exclusive-OR operation with the data on the other disks in the data stripe, including the parity bits associated with the data stripe.

Figure 2:
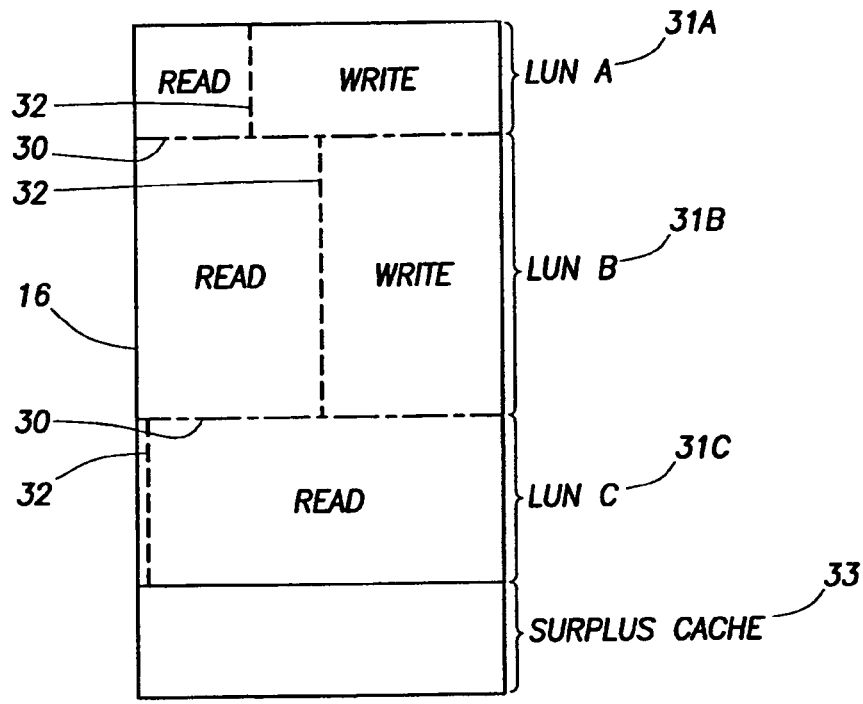
FIG. 2 is a diagram of a cache.

The Level 5 RAID array of FIG. 2 includes five disks 20. In the example of FIG. 2, three data stripes are written across the five disks of the array. Each data stripe is two blocks wide, as each data stripe includes two blocks in each disk. In this example, each stripe is co-extensive with a logical unit or LUN of the drive array. Although, a logical unit could comprise a single stripe or the entirety of or portions of multiple stripes, the logical units of the example of FIG. 2 comprise a single stripe that is two data blocks wide and that is spread across the five drives of the drive array. Each logical unit includes both data bocks and parity blocks. In LUN A, for example, parity blocks Parity 0 and Parity 1 reside on Disk 0. Striped across Disk 1 through Disk 4 is Stripe 0, which includes Block 0 through Block 7. In this example, the bits in the block Parity 0 are derived from an exclusive-OR operation on the data bits of Block 0, Block 2, Block 4, and Block 6; and the bits in the block Parity 1 are derived from an exclusive-OR operation on the data bits of Block 1, Block 3, Block 5, and Block 7. As another example, in LUN C, the parity blocks are saved to Disk 2, and Block 16 through Block 23 of Stripe 2 are saved to Disk 0, Disk 1, Disk 3, and Disk 4. In the case of LUN C, the bits in the block Parity 4 are derived from an exclusive-OR operation on the data bits of Block 16, Block 18, Block 20, and Block 22; and the bits in the block Parity 5 are derived from an exclusive-OR operation on the data bits of Block 17, Block 19, Block 21, and Block 23.

Storage controller 12 includes a processor 14 and a cache 16. Processor 14 is able to access cache 16 to the purpose of accessing data in a manner that is faster than a memory access to one of the disk of the storage array. Processor 14 may access cache 16 for both write command and read commands. At least a portion of cache 16 may function as a write-back cache. In a write-back cache, the data of a write command is written first to the cache and only later flushed to the target location of the write command on a storage drive. Cache 16 could also function according to a write-through caching policy in which each write command is written simultaneously or near simultaneously to the cache and to the target location of the write command on a storage drive. With respect to read commands, cache 16 could function according to a read ahead cache policy in which a block of data associated with a previous read is written to the cache and made available for access in the event of a future read to an address included within the block of data.

Figure 3:
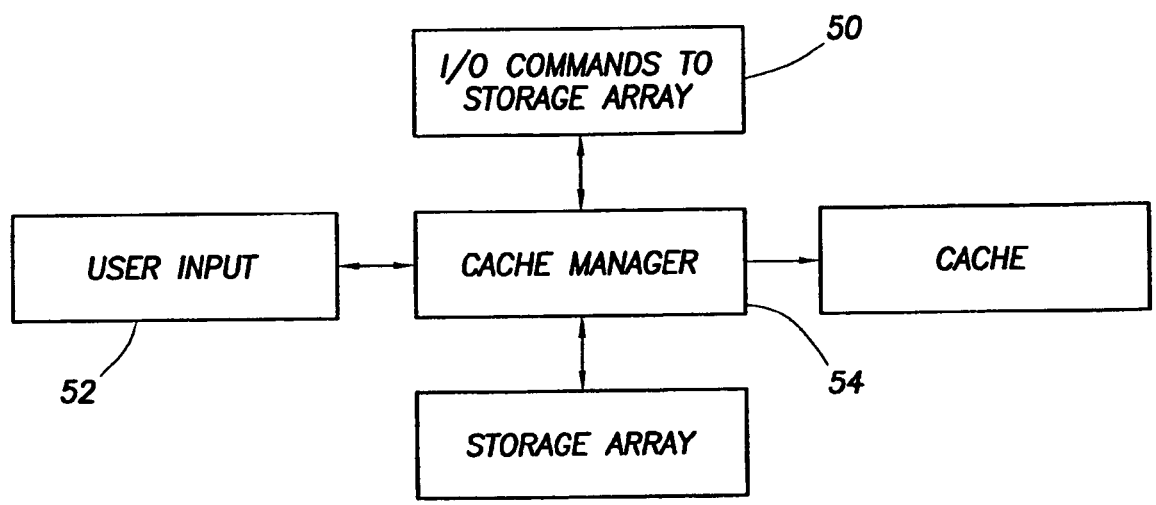
FIG. 3 is a diagram of the communication links to and from a cache management utility.

Shown in FIG. 3 is a diagram of cache 16. As indicated in FIG. 3, cache is 16 is subdivided into several portions, each of which is associated with and used for caching data to and from one of the logical units of the storage array. In the example of FIG. 2, portion 31A is associated with LUN A; portion 31B is associated with LUN B; and portion 31C is associated with LUN C. The size of each portion 31 can be adjusted so that more or less of the available cache is allocated to a logical unit of the storage array. It should be recognized that the boundaries between the portions 31 are indicated logically and that the logical divisions are shown to indicate the relative sizes of the portions 31 of cache 16. Cache 16 includes a surplus cache that is unallocated to any one of the logical units of the storage array. If one of the allocated portions is expanded to accommodate the caching characteristics of the logical unit, some or all of the surplus cache is added to the respective allocated portion. If an allocated portion is able to release a portion of its cache, the released cache portion is added to the surplus cache. The term cache portion, as used herein, refers to the portion of the cache that is dedicated or allocated to a single logical unit.

Each cache portion 31 is divided into a write subportion and a read subportion. As such, the cache for each logical unit is subdivided into a subportion that is dedicated to write caching and a subportion that is dedicated to read caching. The size of the read and write subportions can be adjusted so that more or less of a read subportion and more or less of a write subportion is set for the portion 31 of cache 16 allocated to a logical unit. As an example of the differences between the relative write and read subportions allocated to different logical units, it is apparent that the write subportion allocated to LUN A is relatively larger than the write subportion allocated to LUN B. As a further comparison, the relative sizes of the read and write subportions of the cache allocated to LUN C have been set such that read subportion comprises the entire cache portion allocated to LUN C. The term cache subportion, as used herein, refers to the subportion of a cache portion that is dedicated to either read caching or write caching.

The relative sizes of the portions of the cache allocated to each logical unit and the relative sizes of the read and write subportions of each cache portion can be dynamically adjusted to reflect the I/O characteristics of each logical unit. In operation, the processor executes a cache management utility that is operable to adjust the sizes of the portions and subportions of the cache. The cache management utility 54 monitors the I/O commands transmitted to the storage array, as indicated at box 50. The cache management utility 54 also receives input from a user or administrator, as indicated at box 52. On the basis of settings set by the user or system administrator and on the basis of the characteristics of I/O commands transmitted to the storage array, cache manager 54 is operable to adjust the size of the cache allocated to each logical unit and to adjust the size of the read and write subportions of the portion of the cache allocated to a particular logical unit.

Figure 4:
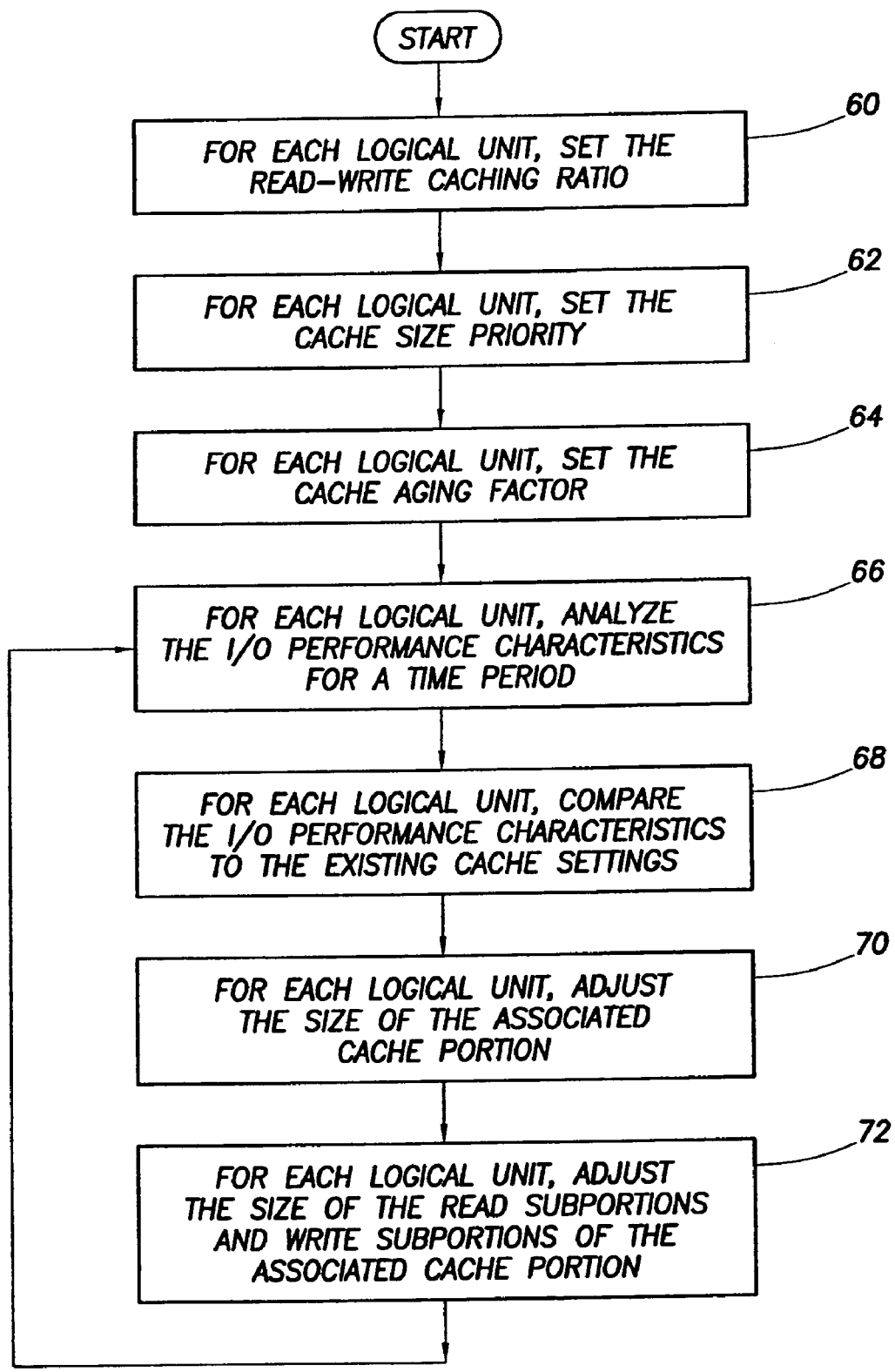
FIG. 4 is a flow diagram of a method for identifying the characteristics of read and write commands directed to a storage array and for dynamically adjusting the characteristics of a cache in a manner that is specific to each logical unit of the storage array.

FIG. 4 is a flow diagram of a series of method steps for identifying the characteristics of read and write commands directed to a storage array and for dynamically adjusting the characteristics of a cache in a manner that is specific to each logical unit of the storage array. The first several steps of FIG. 4 comprise the setting of initial parameters for the cache. At step 60, the cache manager sets the read-write ratio for the cache portion allocated to each of the logical units of the storage array. Thus, for each logical unit, there is an initial setting of the relative size of the cache allocated to the logical unit that is to be used for read caching and the relative size of the cache allocated to the logical unit that is to be dedicated to write caching. As an example, the initial read-write setting for a certain logical unit could be 50-50, indicating that half of the cache associated with the logical unit is for read caching and half of the cache associated with the logical unit is set aside for write caching. As another example, the read-write setting could be set at 100-0, indicating that all of the cache for the associated logical unit is to be used for read caching and that no write caching is performed for commands transmitted to the logical unit. The initial setting of the read-write ratio for each portion of the cache dedicated to a logical unit may be input by the user or system administrator.

At step 62, the size of the portion of the cache dedicated to each logical unit is set by the cache manager utility. The size of the portion of the cache dedicated to each logical unit may be set on the basis of a cache size priority indicator received from a user. A cache size priority of high for a logical unit would indicate that a large cache portion should be associated with the logical unit; and a cache size priority of low for a logical unit would indicate that a smaller cache portion should be associated with the logical unit. After receiving the cache size priority setting, the cache manager applies the settings to establish an initial size of the cache portions dedicated to each logical unit of the storage array.

At step 64, the cache manager utility sets for each cache portion dedicated to a logical unit an indicator associated with a cache aging parameter. The cache aging parameter determines who long data should be allowed to remain in the caching. If the cache aging parameter is set to "permanent," any data in the cache is allowed to stay in the cache indefinitely. If the cache aging parameter is set to "reuse," data is discarded or flushed to the storage array after the data has resided in the cache for a predetermined period of time associated with the reuse setting. If the cache aging parameter is set to "transient," any data residing in the cache can be released or ignored, as such data likely comprises transient files such as temporary files or intermediate data. If the aging factor for a cache portion is set to "permanent," the cache management utility cannot sweep the contents of the cache to the storage array. Rather, the cache management utility must allow the contents of the cache portion to remain in the cache until swept out of the cache according to the read and write caching rules of the cache portion.

The steps 66 through 72 of FIG. 4 are performed in periodically and at predetermined intervals to monitor the status and relative sizes of the portions and subportions of the cache to adjust the sizes of the portions and subportions of the cache due to the I/O activity directed to the storage array. Steps 66 through 72 may also be performed when there is a measured performance degradation in the I/O activity of the storage array. At step 66, the cache management utility monitors the I/O accesses directed to each logical unit of the storage array. For each logical unit, the cache management utility compares the history of I/O activity directed to the logical unit to the current set of cache parameters for the logical unit and determines if an adjustment of the size of a cache portion or a cache subportion should be adjusted. At step 68, the cache management utility compares the history of data access commands to the logical unit to the current cache settings. At step 68, the cache management utility determines if a cache portion should be adjusted in size. It may be advantageous to expand the size of a cache portion if the logical unit has a relatively high number of read command or write command that are not be satisfied by the data that resides in the cache. As an example, if the logical unit is receiving a large number of sequential write commands, it will be advantageous to expand the size of the write cache so that more of the write data may be saved to the cache and so that a larger set to sequential write data may be later saved or written back to the logical unit as part of a single operation. As another example, if the logical unit is receiving a number of read commands and those read commands cannot be satisfied from the cache, resulting in a number of cache misses, it may be advantageous to expand the size of the cache. In addition, if a cache portion has a "permanent" aging factor, it may be advantageous to expand the cache, as the contents of the cache likely do not comprise temporary or transient data. It may also be advantageous to reduce the size of a cache portion allocated to a logical unit. If, for example, all or nearly all of the data accesses to a logical unit are satisfied from the cache, the size of the cache may reduced in size while nevertheless retaining a size large enough to accommodate the data access activity directed to the logical unit associated with the cache portion. If a cache portion should be adjusted in size, the size of the cache portion is adjusted at step 70. With reference to FIG. 2, the size of the cache portion is adjusted by modifying the location of the logical boundaries 30 between the cache portions, thereby making some cache portions larger and some smaller. If the cache has a surplus cache 33, a cache portion may be expanded by assigning memory space from the surplus cache to the cache portion. Similarly, a cache portion may be reduced in size by releasing data from the cache portion to the surplus cache.

At step 68, the cache management utility also determines if the relative sizes of the cache subportions of a cache portion should be adjusted. It may be advantageous to adjust the relative sizes of the cache subportions because the number of cache misses from read commands greatly exceeds the number of cache misses from write commands, or the number of cache misses from write commands greatly exceeds the number of cache misses from read commands. As one example, a logical unit may, over a period of time, receive only read commands. As a result, the number of cache misses for read commands will outnumber the cache misses for write commands. As a result, the size of the cache portion allocated to caching read commands is expanded to better match the characteristics of the I/O commands directed to the logical unit. If a cache subportion should be adjusted in size, the size of the cache subportion is adjusted at step 72. With reference to FIG. 2, the size of the cache portion is adjusted by modifying the location of the logical boundary 32 in the cache portion, thereby enlarging the read cache relative to the write cache or enlarging the write cache relative to the read cache.

Thus, by executing the steps set out in FIG. 4, the sizes and read/write characteristics of the cache allocated to each logical unit may be modified on the basis of the characteristics of the access commands directed to the logical unit. The cache dedicated to each logical unit may be individually adjusted on the basis of the access commands directed to the logical unit. The cache adjustment method disclosed herein is adaptive in that the cache adjustment method is operable to modify in the size of each cache portion and cache subportion in response to changes in the data access patterns to each logical unit in the cache. As such, as the data access pattern to a logical unit changes, the size of the cache portion or cache subportions allocated to the logical unit will dynamically change as well. Although the method disclosed herein is adaptive, the method does take into account a set of user-defined settings for the cache. Following the monitoring of the data access commands directed to the storage array, the user-defined settings in the cache may be adjusted to better manage the operation of the cache relative to the actual pattern of data access commands transmitted to the logical units of the storage array. As a result of the dynamic, adaptive method disclosed herein, the cache associated with a storage array is operable to be adjusted to respond to the changing workloads and demands of each logical unit of the storage array. The adaptive nature of the method disclosed herein allows the cache to be adjusted so that it performs optimally with references to the data access demands on each of the logical units of the storage array.

Although the caching system and method disclosed herein has been described with respect to a Level 5 RAID array, it should be recognized that the invention disclosed herein is equally effective with respect to other RAID storage formats. It should also be recognized that the self-adjusting storage methodology disclosed herein may be employed in managed storage arrays other than RAID arrays and with logical units comprise all or a portion of one more stripes of data of a storage array. Although the present disclosure has been described in detail, it should be understood that various changes, substitutions, and alterations can be made hereto without departing from the spirit and the scope of the invention as defined by the appended claims.

What is claimed is:

1. A method for managing the operation of a cache in a storage network, wherein the cache is communicatively coupled to a storage array comprising multiple logical units, comprising:

apportioning the cache so that each of the logical units of the storage array is associated with a portion of the cache, wherein the step of apportioning the cache comprises the step of setting the size of a cache portion associated with a logical unit on the basis of a command received from a user concerning a priority of the logical unit for cache sizing;

setting a cache aging parameter for each portion of the cache associated with a logical unit, wherein the cache aging parameter represents an amount of time for data in the cache to remain in the cache;

monitoring data access commands transmitted to the logical units of the storage array; and adjusting the size of a cache portion on the basis of an analysis of the cache aging parameter and the data access commands directed to the logical unit associated with the cache portion.

2. The method for managing the operation of a cache in a storage network of claim 1, wherein the steps of monitoring and adjusting are repeated to continuously adjust the size of the cache portion.

3. The method for managing the operation of a cache in a storage network of claim 1, further comprising the step of adjusting, within a cache portion, the size of the cache portion dedicated to caching read commands and the size of the cache portion dedicated to caching write commands on the basis of an analysis of the data access commands directed to the logical unit associated with the cache portion.

4. The method for managing the operation of a cache in a storage network of claim 3, wherein the step of monitoring and the multiple adjusting steps are repeated to continuously adjust the size of the cache portion.

5. The method for managing the operation of a cache in a storage network of claim 3, wherein the step of adjusting, within a cache portion, the size of the cache portion dedicated to caching read commands and the size of the cache portion dedicated to caching write commands, comprises the steps of, monitoring for a period the data access commands transmitted to a logical unit; and determining whether to adjust the size of a cache portion dedicated to caching read commands and the size of a cache portion dedicated to caching write commands on the basis of an analysis of the current size of the cache portion dedicated to caching read commands and the size of a cache portion dedicated to caching write commands when compared with the history of read commands and write commands transmitted to the logical unit during the most recent monitoring period.

6. The method for managing the operation of a cache in a storage network of claim 5, wherein the step of determining whether to adjust the size of a cache portion is based on analysis of the cache misses of read commands transmitted to the logical unit.

7. The method for managing the operation of a cache in a storage network of claim 5, wherein the step of determining whether to adjust the size of a cache portion is based on analysis of the cache misses of write commands transmitted to the logical unit.

8. The method for managing the operation of a cache in a storage network of claim 1, wherein the step of monitoring the data access commands comprises the steps of, monitoring for a period the data access commands transmitted to a logical unit; and determining whether to adjust the size of a cache portion on the basis of an analysis of the current size of the cache portion when compared with the history of data access commands transmitted to the logical unit during the most recent monitoring period.

9. The method for managing the operation of a cache in a storage network of claim 8, wherein the step of determining whether to adjust the size of a cache portion is based on analysis of the cache misses of data access commands transmitted to the logical unit.

10. A storage network, comprising:

a storage controller;

a storage array, wherein the storage array includes multiple logical units; and a memory cache communicatively coupled to the storage controller;

wherein the memory cache is apportioned into multiple cache portions by setting the size of a cache portion associated with a logical unit on the basis of a cache aging parameter set for the cache portion, wherein the cache aging parameter represents an amount of time for data in the cache to remain in the cache, and a command transmitted to the logical unit concerning a priority of the logical unit for cache sizing.

11. The storage network of claim 10, wherein each cache portion within the cache is subdivided into a cache subportion associated with the caching of read commands and a cache subportion associated with the caching of write commands transmitted to the logical unit associated with the cache portion.

12. The storage network of claim 11, wherein the size of the cache subportions of each cache portion may be adjusted on the basis of an analysis of the read commands and write commands transmitted to the logical unit associated with the cache portion.

13. The storage network of claim 12, wherein the size of the cache subportions of each cache portion are periodically adjusted on the basis of an analysis of the read commands and write commands transmitted to the logical unit associated with the cache portion.

14. The storage network of claim 13, wherein the an analysis of the read commands and write commands transmitted to the logical unit associated with the cache portion includes an analysis of cache misses associated with read commands and cache misses associated with write commands transmitted to the logical unit associated with the cache portion.

15. The storage network of claim 10, wherein the size of each of the cache portions is periodically adjusted on the basis of the analysis of the data access commands transmitted to the logical unit associated with each respective cache portion.

16. The storage network of claim 15, wherein the analysis of data access commands transmitted to the logical unit associated with each respective cache portion includes an analysis of cache misses associated with data access commands transmitted to the logical unit.

17. A method for adjusting the characteristics of a cache associated with a storage controller, wherein the storage controller is communicatively coupled to a storage array that includes multiple logical units, comprising:

apportioning the cache into cache portions, wherein each of the cache portions is associated with one of the logical units of the storage array, and wherein the step of apportioning the cache comprises the step of setting the size of the cache portion associated with the associated logical unit on the basis of a command received from a user concerning a priority of the associated logical unit for cache sizing;

setting a cache aging parameter for each portion of the cache associated with one of the logical units, wherein the cache aging parameter represents an amount of time for data in the cache to remain in the cache;

adjusting the size of each cache portion on the basis of an analysis of the cache aging parameter and data access commands transmitted to the logical unit associated with the respective cache portion; and repeating the step of adjusting the size of each cache portion such that the size of the cache portions of the cache are adaptively adjusted on the basis of an analysis of the cache aging parameter and data access commands transmitted to each of the logical units associated with each of the respective cache portions.

18. The method for adjusting the characteristics of a cache of claim 17, further comprising the step of apportioning each cache portion into a subportion associated with the caching of write commands and a subportion associated with the caching of read commands.

19. The method for adjusting the characteristics of a cache of claim 17, further comprising the steps of, adjusting the size of each cache subportion on the basis of an analysis of data access commands transmitted to the logical unit associated with the respective cache portion; and repeating the step of adjusting the size of each cache subportion such that the size of the cache subportions of each cache portion are adaptively adjusted on the basis of an analysis of data access commands transmitted to each of the logical units associated with each of the respective cache portions.

* * * * *